H. MOTE.
HAND DRIVEN IMPLEMENT FOR GARDEN AND FIELD USE.
APPLICATION FILED JULY 15, 1919.
1,318,578.
Patented Oct. 14, 1919.
4 SHEETS—SHEET 1.
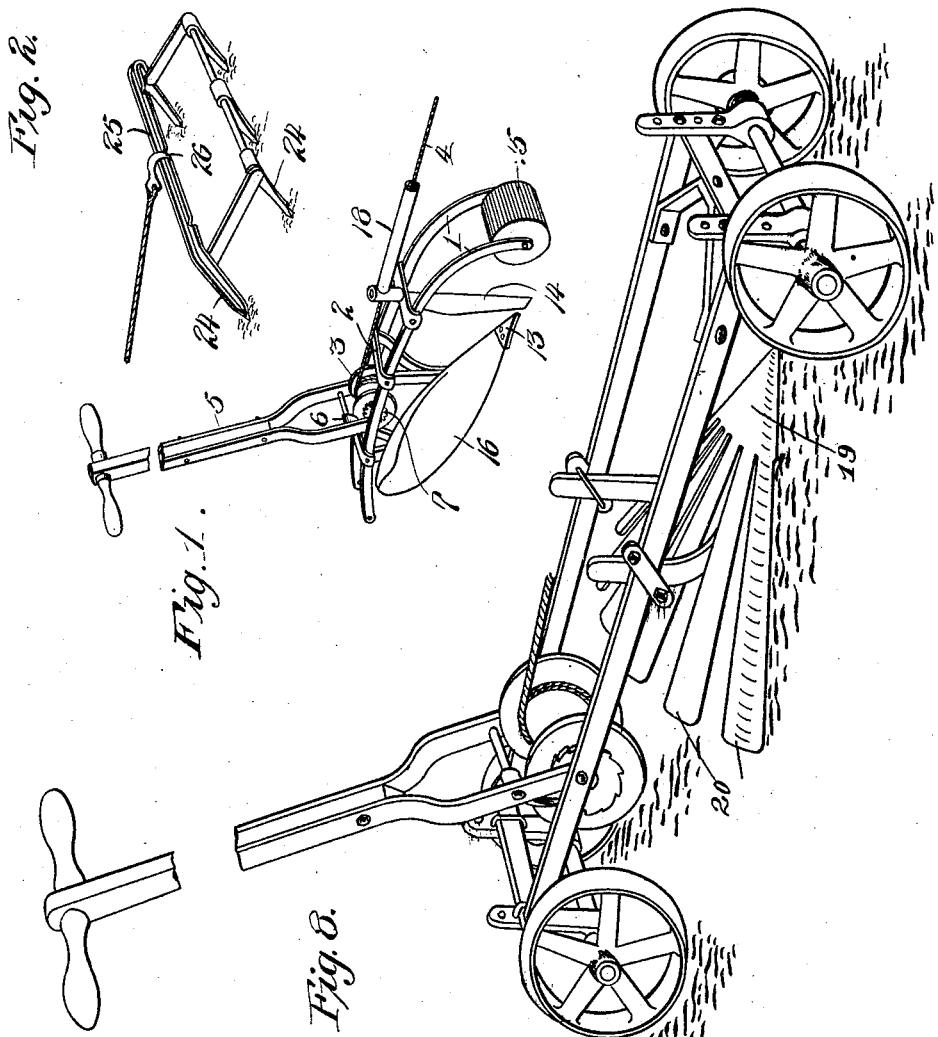

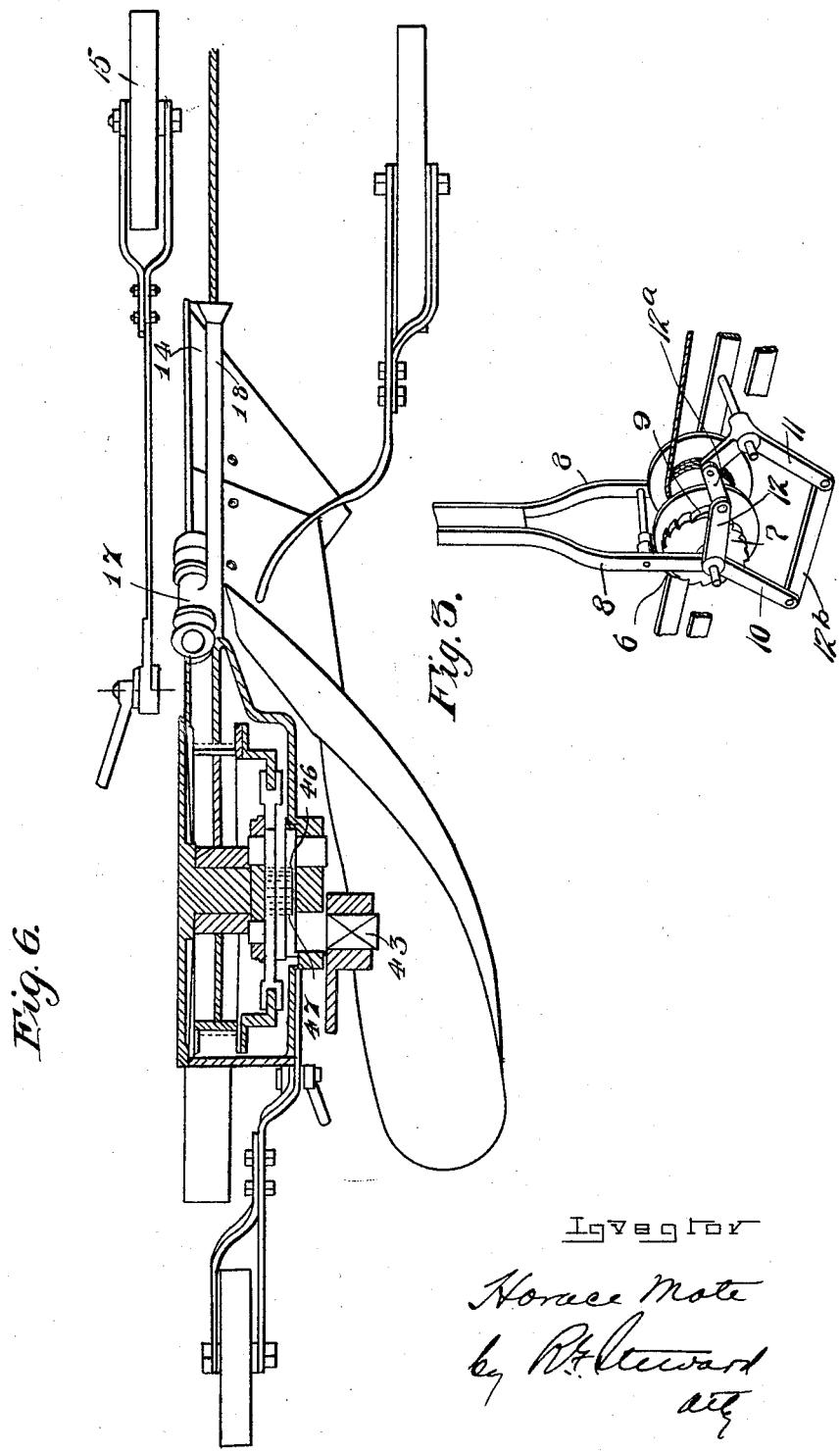

H. MOTE.
HAND DRIVEN IMPLEMENT FOR GARDEN AND FIELD USE.
APPLICATION FILED JULY 15, 1919.
1,318,578.
Patented Oct. 14, 1919.
4 SHEETS—SHEET 3.
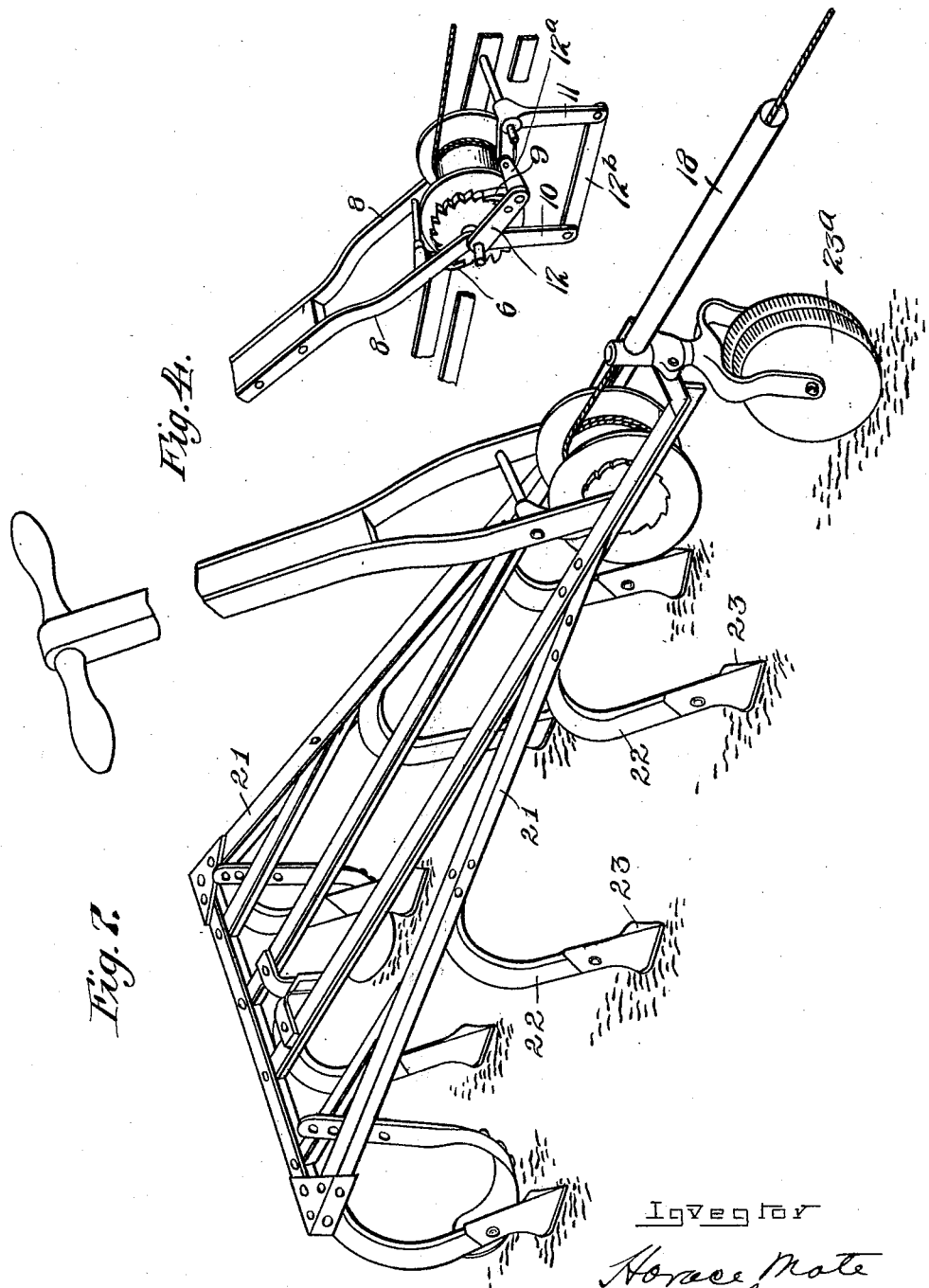

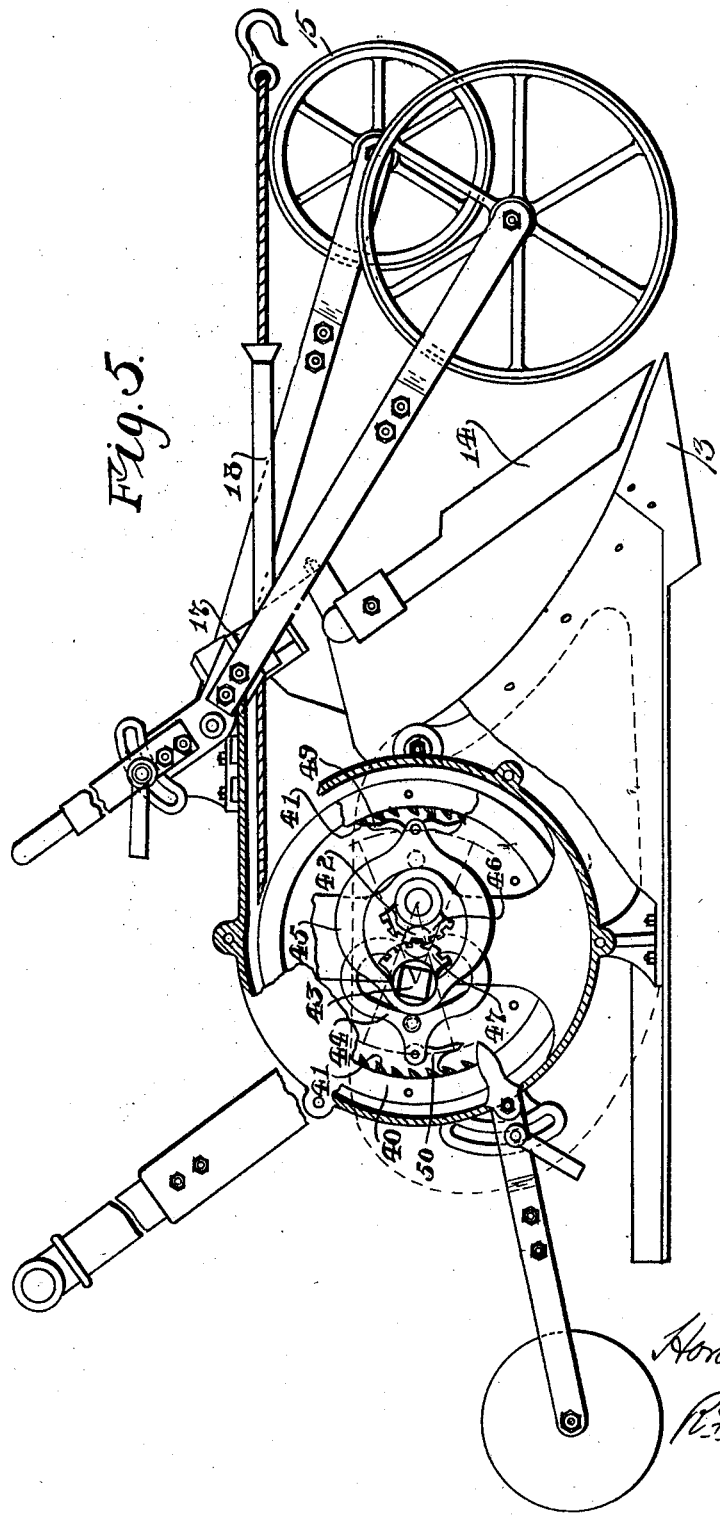

UNITED STATES PATENT OFFICE.

HORACE MOTE, OF POULTON-LE-FYLDE, ENGLAND.

HAND-DRIVEN IMPLEMENT FOR GARDEN AND FIELD USE.

1,318,578. Specification of Letters Patent. Patented Oct. 14, 1919.

Application filed July 15, 1919. Serial No. 311,053.

*To all whom it may concern:*

Be it known that I, HORACE MOTE, a subject of the King of Great Britain, residing in Poulton-le-Fylde, in the county of Lancaster and Kingdom of England, have invented certain new and useful Improvements in Hand-Driven Implements for Garden and Field Use, of which the following is a specification.

This invention has for its object to provide for garden or field use, implements which can be worked by man power instead of horse or motor traction and which can be constructed for use as plows, potato and like diggers, cultivators and other tools for tilling the soil or other agricultural operations.

The invention relates to an agricultural implement of the type in which propulsion is effected by hand-operated means coöperating with a cable attached at one end to an anchor and at the other end to a winding drum carried by the implement.

The invention comprises arrangements in which a rocking hand lever transmits power to a drum on which is wound a cable attached at its other end to an anchor.

The invention further includes mechanism whereby the forward and backward movement of the hand lever causes continuous or practically continuous movement of the drum by employing suitable gearing as hereafter described.

The invention is described by way of example with reference to the accompanying drawings in which:—

Figure 1 represents a simple form of the device.

Fig. 2 represents a suitable form of anchor.

Figs. 3 and 4 show an arrangement in which the ratchet wheel is operated by two pawls while, Fig. 5 is a side view and Fig. 6 a top view, partly in section of a more elaborate arrangement on similar lines.

Fig. 7 is an illustration of the device applying to a cultivator and

Fig. 8 is an illustration of the invention applied to a potato digger.

The beam or frame of the apparatus is by preference made of two iron or steel strips or bars 1 arranged longitudinally and spaced apart by distance pieces 2. Between these strips or bars there is mounted a rotary drum 3 for hauling the implement across a field or garden by means of a single cable 4, this cable being fastened at one end to the drum and anchored at the other end to the ground at one side of the land to be tilled, so that if the drum is driven one way it winds the cable on it and hauls the implement across the land in one direction. The drum is driven by the operation of a hand lever 5 by means of a pawl and ratchet arrangement, the pawl 6 engaging the teeth of the ratchet wheel 7 only when the lever is drawn in one direction and slipping over them when drawn backward, or if desired, two pawls may be provided so arranged as to impart a continuous motion to the drum. Figs. 3 and 4 show this arrangement. The ratchet wheel is fixed to one side of the drum, and the hand lever (which is forked at the lower end so that the prongs 8 of the fork will enter between the spaced bars of the beam) is mounted on the drum spindle, one prong being at one side of the drum and one at the other side. This forked hand lever, which also functions as a guiding handle as in an ordinary agricultural implement, carries a pawl 6 which engages the teeth of the ratchet wheel only when the lever is drawn in one direction, and slips over the teeth when drawn in the other direction; and (if a continuous motion is desired) a second pawl 9 is mounted on a link 12 pivoted at one end on the drum shaft and at the other coupled by link 12ª to one arm of a pivoted bell crank lever 11. The other arm of the bell crank is coupled by a link 12ᵇ to the lower end of the hand lever fork which extends down below the drum at the opposite side of the ratchet wheel to that at which the pawl 6 is located, as indicated at 10. The arrangement is such that when the hand lever is drawn in one direction, the pawl 6 engages the ratchet teeth while pawl 9 slips over them; and when the hand lever is drawn in the opposite direction, the pawl 9, which previously slipped over the teeth, now engages them and continues the rotation of the drum in the same direction as before, the pawls thus acting alternately to impart a substantially continuous rotation to the drum. Fig. 3 shows pawl 6 in operation and Fig. 4, pawl 9. Any other convenient arrangement of pawls may however be used to obtain this continuous rotation of the drum.

Figs. 5 and 6 show another device for securing continuous rotation of the drum (or practically continuous rotation) in which the handle is pivoted at 43. The internal surface of the drum is formed as concave racks 41 with which engage the pawls 49 and 50 linked to the members 44 and 45 which carry convex racks 46 and 47. When the handle is moved downward the member 45 moves upward and the pawl 49 drives the drum by meshing with the concave racks 41. When the handle is raised, pawl 49 rides over the teeth of rack 41, but convex rack 47 drives the inter-meshing convex rack 46 and thus causes pawl 50 to act on concave rack 41. When the lever is pushed forward beyond ordinary working position the two pawls come in contact with pins which throw the pawls out of action, and allow for the drum to be unwound. The colter is on a swivel and controlled by the cable so that it is always kept in direct line, and in case of deviation it can be corrected by the lever which also operates the raising and lowering of the wheels, so that the machine can be run across a field or on the road with the working parts quite clear of the ground. The remainder of the constructional part of the machine will be clear from the said figures.

The beam or frame of the apparatus is made of two iron or steel strips or bars spaced apart as aforesaid, so that the drum can be located between them. This beam or frame which may be curved so as to be a little higher at mid-length than at the ends, or is made absolutely straight, carries in the case of a plow, the plowshare 13, the mold board 16, the leading colter 14, and the depth controlling wheel 15. The plowshare and mold board are carried from the frame by means of hangers or stays or other suitable means, and the frame is provided at or toward the front with the depth controlling wheel. This wheel may be carried between the two bars of the frame upon a cross spindle mounted in holes in the bars, there being a series of spaced holes in a bent down portion at the front of the frame to enable the position of the spindle to be changed, and so allow of the wheel being lowered into use at any desired depth. Or instead of spaced holes, slots may be provided to allow for and maintain the desired adjustment of the spindle.

The colter 14 which projects downward from the beam just in front of the breast of the plowshare so as to make an incision in the soil in advance of the share, is provided at its upper end with an extension in the form of a trunnion 17 which is journaled in a bearing clamped to the beam, such trunnion forming an axis upon which the colter can turn. The upper end of this trunnion has a socket secured to it, from which projects forwardly a tubular arm 18 through which passes the cable upon which the drum winds, so that the tubular arm is always kept in alinement with the cable, and by this means the colter is always held with its cutting edge pointing in the proper direction that is in the line of direction of the cable. The plowshare can if desired be replaced by a ridging breast share, such as is used to ridge up land for beetroot, potatoes, or other sown plants sown on the ridge.

Or again, a share may be applied for digging potatoes from rows or ridges and depositing them on the surface of the ground or elsewhere (Fig. 8). This share which is triangular is somewhat similar in its general shape to that of a pointed shovel. The narrow portion 19 at the front forms the cutting edge while extending rearwardly therefrom are a number of longitudinally projecting fingers 20 spaced apart so as to form a grating through which earth can escape. The front cutting portion lifts the potatoes and delivers them on to the said grating which sifts the earth from among them and drops the potatoes either on to the surface of the ground or elsewhere.

When it is desired to adapt the apparatus for use as a cultivator (Fig. 7), the beam is made as hereinbefore described, such beam forming the traction frame. In addition a pair of supplementary side members 21 are stayed obliquely to the beam so as to produce a frame which except at the apex is of triangular form. To this frame there are secured a plurality of curved prongs 22 which enter the soil obliquely each prong being provided with the usual tooth or share 23. The front of the traction frame is supported by a depth controlling wheel 23ᵃ similar to that already described, while the rear part may also be supported by a similar wheel or shoe member or members 24.

The cable which is anchored at one end to the ground at one side of the field, is secured at the other end to the drum so that as the drum is driven one way it winds the cable on it and hauls the implement across the field in one direction until the headland is reached whereupon the pawls are thrown out of gear with the ratchet wheel, and the implement is pulled back by hand, the drum running free and paying out the cable that was wound on so that the implement is ready to repeat its operation when the pawls are put into reëngagement; and the cable has been shifted into the next position. Fig. 2 shows the anchors or grapnels. These anchors each consist of a frame of suitable length which is adapted to lie flat on the ground, such frame being provided with arms 24 projecting at an angle therefrom so as to enter the ground, and formed at the ends if desired with broad expansions or flukes in order that they may take firm hold of the ground. The frame has a horizontal bar 25 provided at spaced intervals with off-sets 26 to any of which the end of the cable can be coupled, the object of these off-sets being to avoid the removal and refixing of the anchor each time the implement completes a traverse. The anchor has only to be moved into the next position when the cable has arrived opposite the last off-set in the bar.

I declare that what I claim is:—

1. In a hand operated agricultural implement of the character described, the combination with the implement frame, of a cable drum supported thereby, and a rocking hand lever for guiding the implement supported by said frame and operable to transmit power to said drum.

2. In a hand operated agricultural implement of the character described, the combination with the implement frame, of a cable drum supported thereby, a cable coöperating with said drum, a guiding handle connected to said frame but movable with respect thereto, and means whereby movement of said guiding handle actuates said drum.

3. In a hand operated agricultural implement of the character described, the combination with the implement frame, of a cable drum supported thereby, a cable coöperating with said drum, a hand lever for guiding the implement mounted to rock in opposite directions on said frame, and mechanism operatively connecting said lever with said drum, whereby rocking of the lever in either direction effects continuous rotation of the drum.

4. In a hand operated agricultural implement, the combination with the implement frame, of a cable drum supported thereby, a cable coöperating with said drum, a guiding handle pivoted on said frame to rock forward and backward, and ratchet and pawl mechanism operable by such rocking handle to drive said drum.

5. In a cable operated agricultural implement of the character described, the combination, with the implement frame and digger means supported thereby, of a ground-engaging member pivotally mounted on the frame in advance of said digger means for turning movement about an axis lying in a substantially vertical plane, a cable drum mounted on said frame to the rear of said ground-engaging means, driving means for said drum, a cable guide mounted forward of said drum, said guide being connected to said ground-engaging member for pivotal movement therewith about the aforesaid axis, and a cable coöperating with said drum and said cable guide.

In witness whereof I have hereunto signed my name this 30th day of June, 1919, in the presence of two subscribing witnesses.

HORACE MOTE.

Witnesses:
  EDW. SQUIRE,
  ARTHUR JORDAN.

Copies of this patent may be obtained for five cents each, by addressing the "Commissioner of Patents, Washington, D. C."